United States Patent
Koether et al.

(10) Patent No.: US 6,505,546 B1
(45) Date of Patent: Jan. 14, 2003

(54) COOL ZONE AND CONTROL FOR PRESSURE FRYER

(75) Inventors: Bernard G. Koether, Tequesta, FL (US); William Doherty Motherway, Fairfield, CT (US)

(73) Assignee: Technology Licensing Corporation, Tequesta, FL (US)

( * ) Notice: Subject to any disclaimer, the term of this patent is extended or adjusted under 35 U.S.C. 154(b) by 0 days.

(21) Appl. No.: 08/027,117

(22) Filed: Mar. 4, 1993

Related U.S. Application Data

(63) Continuation-in-part of application No. 07/839,612, filed on Feb. 21, 1992, now abandoned.

(51) Int. Cl.$^7$ ................................................ A47J 37/12
(52) U.S. Cl. ............................... 99/408; 99/403; 99/336
(58) Field of Search ............................... 99/403, 408, 330, 99/336

(56) References Cited

U.S. PATENT DOCUMENTS

| | | | | |
|---|---|---|---|---|
| 1,264,740 A | * | 4/1918 | Young | 99/408 |
| 1,990,351 A | | 2/1935 | Shroyer | |
| 1,996,434 A | | 4/1935 | Dowd | |
| 2,305,039 A | | 12/1942 | Stead | |
| 2,337,481 A | | 12/1943 | Lowe | |
| 2,716,938 A | | 9/1955 | Smith | 99/408 |
| 2,899,889 A | | 8/1959 | Wilson | 99/408 |
| 3,363,541 A | | 1/1968 | Anetsberger | |
| 3,431,834 A | | 3/1969 | Keathley et al. | 99/336 |
| 3,573,861 A | | 4/1971 | Lecrone | |
| 3,618,587 A | | 11/1971 | Lee | |
| 3,655,411 A | | 4/1972 | Albright | 99/330 |
| 4,070,289 A | * | 1/1978 | Akcasu | 219/440 |
| 4,296,310 A | * | 10/1981 | Luebke et al. | 99/408 |
| 4,313,371 A | | 2/1982 | Jackson et al. | |
| 4,503,320 A | * | 3/1985 | Polser | 99/330 |
| 4,603,622 A | * | 8/1986 | Beck | 99/331 |
| 4,668,390 A | * | 5/1987 | Hurley et al. | 99/408 |
| 4,686,896 A | * | 8/1987 | Gordon | 99/332 |
| 4,798,939 A | | 1/1989 | Nett | |
| 4,911,068 A | | 3/1990 | Koether et al. | |
| 4,930,408 A | | 6/1990 | King et al. | |
| 4,974,501 A | * | 12/1990 | Grob et al. | 99/330 |
| 5,033,368 A | | 7/1991 | Brewer | 99/403 |
| 5,048,400 A | | 9/1991 | Ueda et al. | |
| 5,090,305 A | * | 2/1992 | Lehman | 99/330 |
| 5,232,151 A | * | 8/1993 | Mercer et al. | 99/403 |
| 5,355,776 A | * | 10/1994 | Driskill | 99/336 |

FOREIGN PATENT DOCUMENTS

| | | | | |
|---|---|---|---|---|
| CA | 481804 | | 3/1952 | |
| CA | 622425 | | 6/1961 | |
| DE | 738120 | | 8/1943 | |
| EP | 172702 | | 2/1986 | |
| FR | 1153846 | * | 6/1956 | 99/408 |
| GB | 668613 | | 3/1952 | |
| GB | 1504144 | | 3/1978 | |
| IT | 0586493 | * | 12/1958 | 99/408 |

* cited by examiner

Primary Examiner—James Hook
(74) Attorney, Agent, or Firm—Pennie & Edmonds LLP

(57) ABSTRACT

A vessel for cooking food under pressure wherein the shape of a bottom surface of the vessel and the position of heating elements which heat cooking fluid contained within the vessel act to form a cool zone in a region near the bottom surface. Within the cool zone, the temperature of the cooking fluid is maintained below the cooking temperature so that food particles dislodged from the food being cooked do not burn and contaminate the cooking fluid. In addition, the temperature in the cool zone is maintained above the boiling point of water so that moisture contained within the food particles is continuously evaporated during the cooking cycle, preventing boil over conditions. A novel pressure release system is provided for intermittently operating a pressure release valve near the end of the cooking cycle. A computer controller controls operation of the release valve based upon the temperature of the cooking fluid to eliminate sudden drops in temperature.

21 Claims, 3 Drawing Sheets

COOL ZONE AND CONTROL FOR PRESSURE FRYER

RELATED APPLICATIONS

This application is a continuation-in-part of application Ser. No. 07/839,612, filed on Feb. 21, 1992 now abandoned.

BACKGROUND OF THE INVENTION

The invention relates to cooking appliances and, in particular, to a pressure fryer designed to prevent accumulation of condensed moisture within the cooking fluid.

Pressure cookers are well known in the field of cooking appliances. In such pressure cookers, the pressure inside a cooking vessel is increased above atmospheric pressure to cook food quickly while also retaining moisture in the food. Items such as chicken and fish are commonly cooked in this type of appliance. The food is often first coated with a breading and then cooked in a cooking fluid, such as oil, for a predetermined time period. Near the end of the time period, or cooking cycle, a valve is opened releasing the pressure inside the fryer so that the food items can be safely removed therefrom.

During the cooking process, small particles of the breading typically used to coat the food items being cooked often become dislodged and fall to the bottom. If these particles, commonly referred to as "cracklings", remain in the cooking oil during subsequent cooking processes, they can burn and contaminate the cooking oil.

In order to prevent such contamination, many prior cooker designs have incorporated what is commonly termed as a "cold zone". This cold zone typically comprises a deep trough formed in the bottom surface of the cooking pot to collect the cracklings which accumulate during operation. The burners or heating elements are typically positioned well above the cold zone such that the zone is maintained at a temperature substantially lower than the cooking temperature. In this manner, cracklings may accumulate during successive cooking operations without burning and contaminating the cooking oil.

An example of such a pressure cooker is shown in U.S. Pat. No. 4,930,408 to King. The pressure cooker comprises a cooking vat divided into an upper cooking zone and a lower cold zone interconnected by a tapered annular wall. The cold zone is substantially smaller than the cooking zone, preferably comprising 20–30% of the volume of the vat. The cooking oil is heated by heating elements which line the walls of the vat in the lower portion of the cooking zone. The cold zone is maintained in essentially quiescent condition and at a substantially lower temperature than the temperature of the oil in the cooking zone to minimize cooking of cracklings and other contaminants.

U.S. Pat. No. 4,273,991 to Barnhill discloses a pressure fryer including strip heaters on the front wall, rear wall, and side walls of the fryer. The bottom edge of each lower most strip heater on each of the walls is spaced above the bottom edges of the tank's side walls to create a relatively cold zone for the cooking liquid within the tank's trough. Food particles which fall to the tank floor migrate toward the center of the floor since it is sloped downwardly relative to the bottom edges of the side wall, and are less likely to turn to charcoal.

U.S. Pat. No. 1,990,351 to Shroyer discloses a grease kettle including heating element which extends substantially through 270° of arc of the circumference of the kettle and at its ends is provided with terminal portions which extend through the bottom of the kettle. A second heating element is arranged into a series of vertical convolutions spaced at intervals about the portion of the periphery of the kettle and is provided with terminal portions extending through the bottom wall of the kettle. The patent discloses that by reason of the arrangement of the heating elements, grease in the lower portion of the kettle over substantially the entire bottom surface will remain at a temperature below that at which food sediment will char or burn. At the same time, grease at the frying level will be heated to the frying temperature.

In these types of pressure fryers, the cracklings which become dislodged from the food being cooked naturally contain moisture. During subsequent cooking cycles, this moisture collects and condenses in the cold zone generally without problem. However, if the cooking process is interrupted for a short period of time between cooking cycles, oil stratification may occur. To provide a uniform oil temperature prior to resuming cooking operation, the oil is typically stirred. In the known pressure fryers described above, when stirred entrapped water in the cracklings contacts the cooking oil which is at temperature greater than the boiling point of water, 212° F., and can be as high as 350°. The water thus converts to steam, causing a boil over condition which can injure the operator of the cooking appliance. Boil over also results, due to the same effect, from the naturally occurring convection currents within the oil which cause entrapped water to move up into the hot oil.

Canadian Patent No. 622,425 to Kelton discloses a pressure cooker including a cylindrical portion at the bottom of the vessel which constitutes a sump or sediment chamber into which fall particles of food. An elongated metal equalizer mounted in the center of the vessel is intended to conduct heat from the hot fat downwardly into the sump zone thereby keeping the sump above the boiling point of water, but also maintaining it below the burning point of the crumbs. However, in practice, this design has not proved successful. Also, the addition of such an equalizer to the interior of the cooking vessel limits the volume available for cooking and further restricts the use of baskets or racks typically placed in the vessel to support food items.

Another problem associated with the use of a cold zone is that as the water evaporates from the cracklings there is a period of time during which it passes through the cooking oil. When the cook cycle is complete and the pressure relief valve is opened, these small bubbles of water evaporate. Such evaporation results in a sudden undesirable temperature drop in the cooking oil.

SUMMARY OF THE INVENTION

The present invention provides a unique pressure fryer design in which the shape of the fryer and the placement of the heaters which heat the cooking liquid therein act to provide a cool zone at the bottom of the fryer. Within this cool zone, the temperature is maintained above the boiling point of water such that moisture contained within food particles is evaporated and the above-described boil-over condition is prevented. In addition, the temperature within the cool zone is kept well below the cooking temperature such that the food particles do not burn and contaminate the cooking fluid.

In accordance with the present invention, the pressure fryer includes a vat for containing cooking fluid. Preferably, the vat has a gently sloping bottom surface surrounded by a plurality of side walls. The bottom surface includes a central flat portion defining a lowermost point on the bottom surface. A plurality of heating elements are positioned on the side walls of the vat a sufficient vertical distance above the lowermost point on the bottom surface to form a cool zone between the heating elements and the bottom surface. In this manner, the temperature within the cool zone is maintained below the cooking temperature, but above the boiling point of water.

Another object of the invention is to prevent and/or control a sudden unwanted temperature drop in a pressure cooker caused by the sudden release of pressure and evaporation of water in the cooking oil. It is also noted that the invention has applicability in any environment where it is desirable to control the sudden decrease in temperature due to a pressure decrease.

In accordance with this aspect of the invention, a method and apparatus are provided for releasing the pressure from within the fryer and eliminating or minimizing the associated temperature drop. In accordance with the invention, a pressure release valve is operatively connected to a computer controller, which includes, as one of its inputs, output signals provided by a temperature sensor or sensors which are used to detect the temperature and rate of change of the temperature of the cooking oil. Near the conclusion of the cooking cycle, the pressure release valve is opened by the controller and the pressure within the fryer is released. The temperature and rate of change thereof are monitored by the controller. When the temperature of the oil detected drops to a predetermined temperature level and the rate of change detected by the controller indicates that the temperature is decreasing, the pressure release valve is closed and the cooking medium is allowed to absorb more heat. When the temperature rate of change stabilizes and/or the temperature of the cooking oil increases slightly, the pressure release valve is once again opened. The process is repeated at frequent intervals, with each opening of the pressure release valve allowing a small amount of pressure release and shutting to stop the release of pressure from the fryer when the temperature decreases and falls below a predetermined level.

Thus, the resulting arrangement provides for pressure release as quickly as possible while maintaining the temperature of the cooking medium at or near a predetermined set temperature. The intermittent release of pressure prevents undesirable rapid temperature drops.

DETAILED DESCRIPTION OF THE INVENTION

Figure 1:
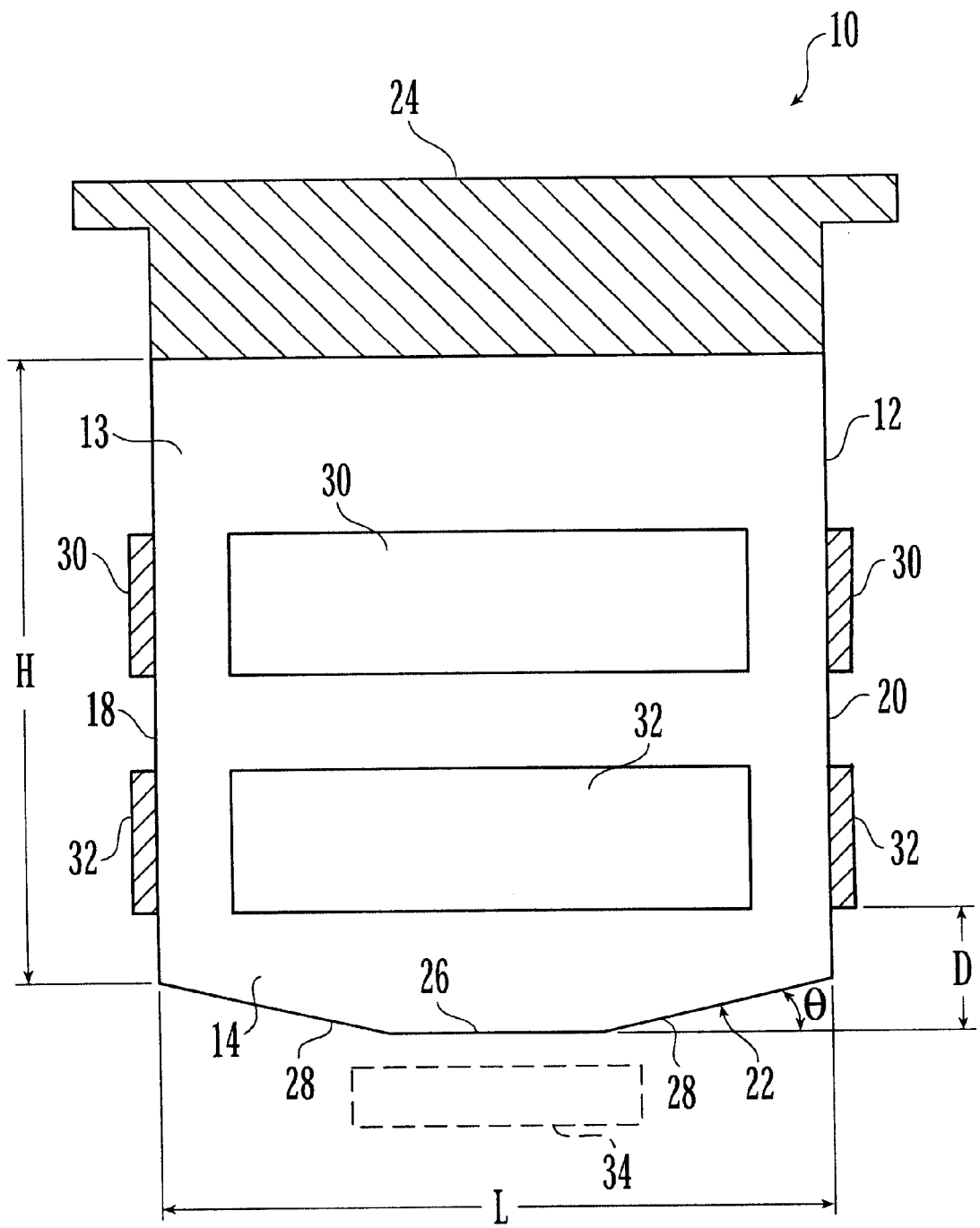
FIG. 1 is a side view of a pressure fryer in accordance with the present invention.

FIG. 1 illustrates a device for cooking food under pressure according to the invention. Preferably the device comprises a pressure fryer 10 having a generally rectangular or square vat 12 for holding a supply of cooking fluid 13 (shown in FIG. 2), such as cooking oil. The vat includes a front wall 14, a back wall (not shown), two side walls 18, 20, and preferably a gently sloping bottom surface 22; although flat bottoms may be utilized. A cover 24 seals the top of the vat 12 in a known manner so that the pressure within the vessel may be increased above atmospheric pressure to effect pressure cooking of food contained within the vat. The bottom surface 22 of the cooking vat 12 comprises a substantially horizontal or flat base portion 26 defining a lowermost point on the bottom surface 22. The base portion 26 is surrounded by a plurality of sloping portions 28 which originate at a respective wall of the vat 12 and slope downwardly, terminating at the flat base portion 26 of bottom surface 22.

Figure 2:
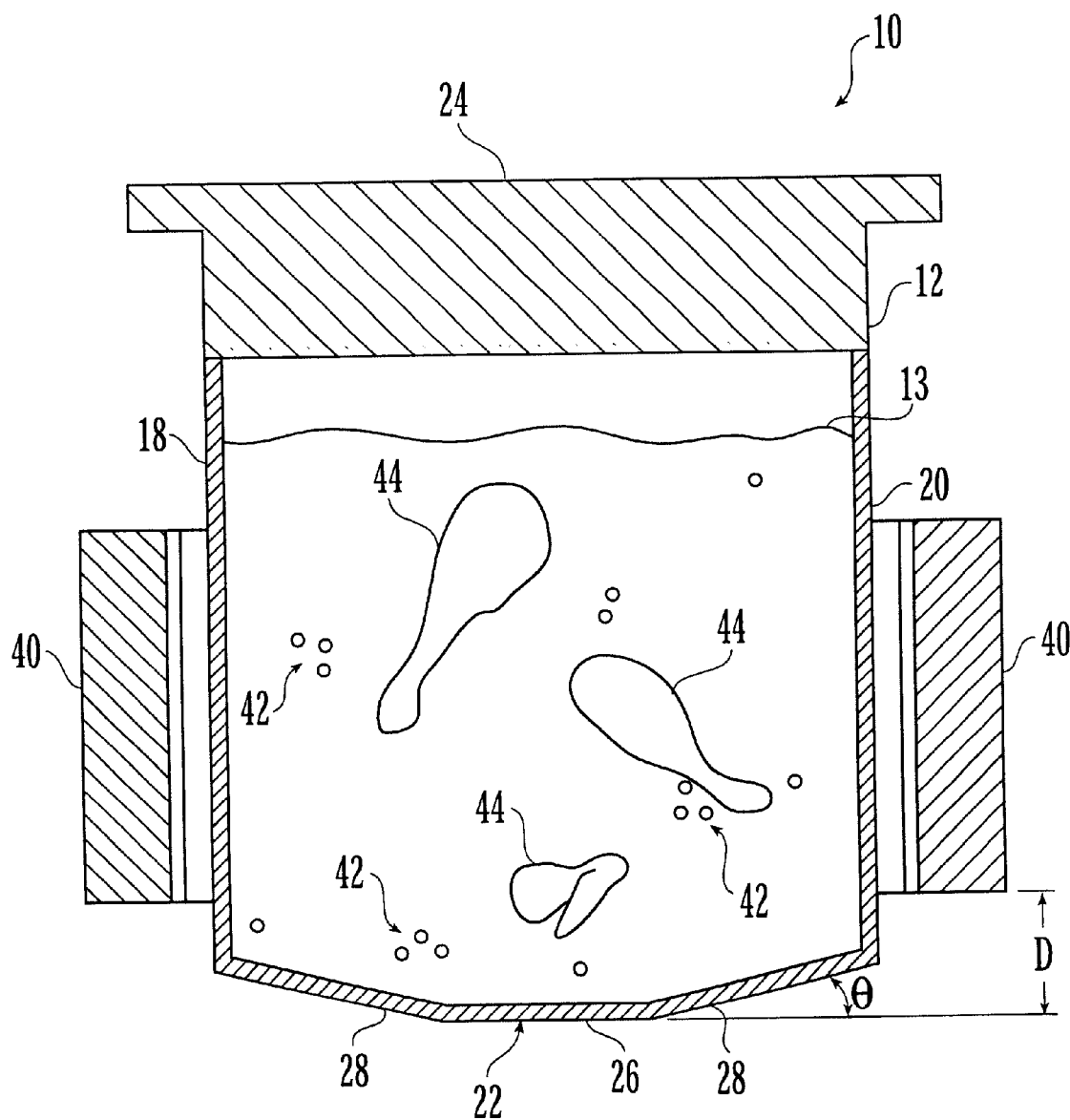
FIG. 2 is a cross-sectional view of a further embodiment of a pressure fryer in accordance with the invention.

The cooking oil 13 is heated in the vat 12 by appropriate heating elements mounted on the exterior surface of the walls of the vat. The heating elements are controlled by a temperature controller (not shown) as is well known in the art. During the cooking cycle, the heating elements are activated by the temperature controller to heat the cooking fluid contained in the vat to a cooking temperature of typically approximately 260° or higher to effect cooking of the food placed within the vessel. In one embodiment, upper and lower electric heating elements 30, 32 are positioned on the front wall 14, back wall, and two side walls 18, 20 of the vat 12. Alternatively, as illustrated in FIG. 2, gas burners 40 may be used to heat the cooking fluid in the vat. In this configuration, preferably one or two gas burners 40 are attached to each side wall 18, 20 of the vat 12.

In accordance with the invention, the lower electric heating elements 32 or gas burners 40 are positioned on the walls of the vat 12 at a sufficient vertical distance (D) above the lowermost point on the base portion 26 to maintain the cooking fluid therebetween at a temperature below the cooking temperature of the rest of the fluid and above the boiling point of water. This arrangement provides a cool zone in the bottom of the vat between the bottom edge and the base portion of the bottom surface, as will be set forth in more detail below.

Referring to FIG. 2 as previously described, during the cooking cycle, pieces of the breading or other coating commonly referred to in the industry as cracklings 42 become dislodged from the food products 44 being cooked within the vat and tend to drift downward towards the bottom surface 22 of the vat 12. In the present invention, the slope of the sloping portions 28 of the bottom surface 22 is preferably sufficiently steep to direct such cracklings onto the flat base portion 26. In particular, for a vat designed to hold 100 lb. of cooking fluid having a side wall height (H) of approximately 35 inches, a base portion length (L) of approximately 29 inches, and a total volume of approximately 3500 cubic inches, a preferred upward slope angle ($\theta$) of the sloping portions with respect to the base has been found to be about 9° to 21° more preferably approximately 13° to 17°. In this example, the lower electric heating elements 32 or gas burners 40 are positioned at distance (D) equal to approximately 2 to 3 inches above base portion 26, preferably about 2 inches, so that the temperature of the cooking oil in the cool zone is kept substantially below the cooking temperature. A preferred temperature for the cool zone region within the vat 12 is thus approximately 245° F. In this manner, the cracklings settling on the base portion 26 of the bottom surface 22 are not located near enough to the heating elements to burn and contaminate the cooking oil.

The heating elements 32 or 40 are also positioned near enough to the bottom surface 26 of the cooking vat 12 where the cracklings 42 settle so that the temperature of the cool zone is kept higher than the boiling point of water. Because the temperature of the cooking oil is maintained above the boiling point of water, the moisture naturally contained in the cracklings 42 will evaporate and will not suddenly mix with the cooking oil 13 if later stirred. Instead, the moisture contained in the food particles 42 evaporates and passes through the oil 13 continuously during the cooking cycle as does any moisture remaining at the end of a cycle. Thus, dangerous boil over conditions associated with prior art designs are avoided.

Thus, the arrangement of heating elements 30, 32, or 40, in combination with the sloping shape of bottom surface 22 and horizontal base portion 26 create a cool zone at the bottom of vat 12 wherein the temperature of the cooking oil contained therein is maintained at a temperature above the boiling point of water at the highest pressure encountered in the fryer during the cook cycle, yet well below the cooking temperature. A preferred range of temperature of the cool zone is between about 212° F. and 250° F. and, as stated above, preferably about 245°. Those skilled in the art will appreciate that other means for maintaining this temperature range at the bottom of the vat (in particular, within about 2–3 inches of the bottom) could also be used. For example, a heating element 34 could be positioned below the bottom surface 22 of the vat 12 as shown in phantom in FIG. 1 and used in connection with other heating elements to maintain the temperature of the cooking oil between about 212° F. and 250° F. Maintaining the temperature of the cooking oil in this desired range is achieved according to the invention with a completely unobstructed cooking vat.

Figure 3:
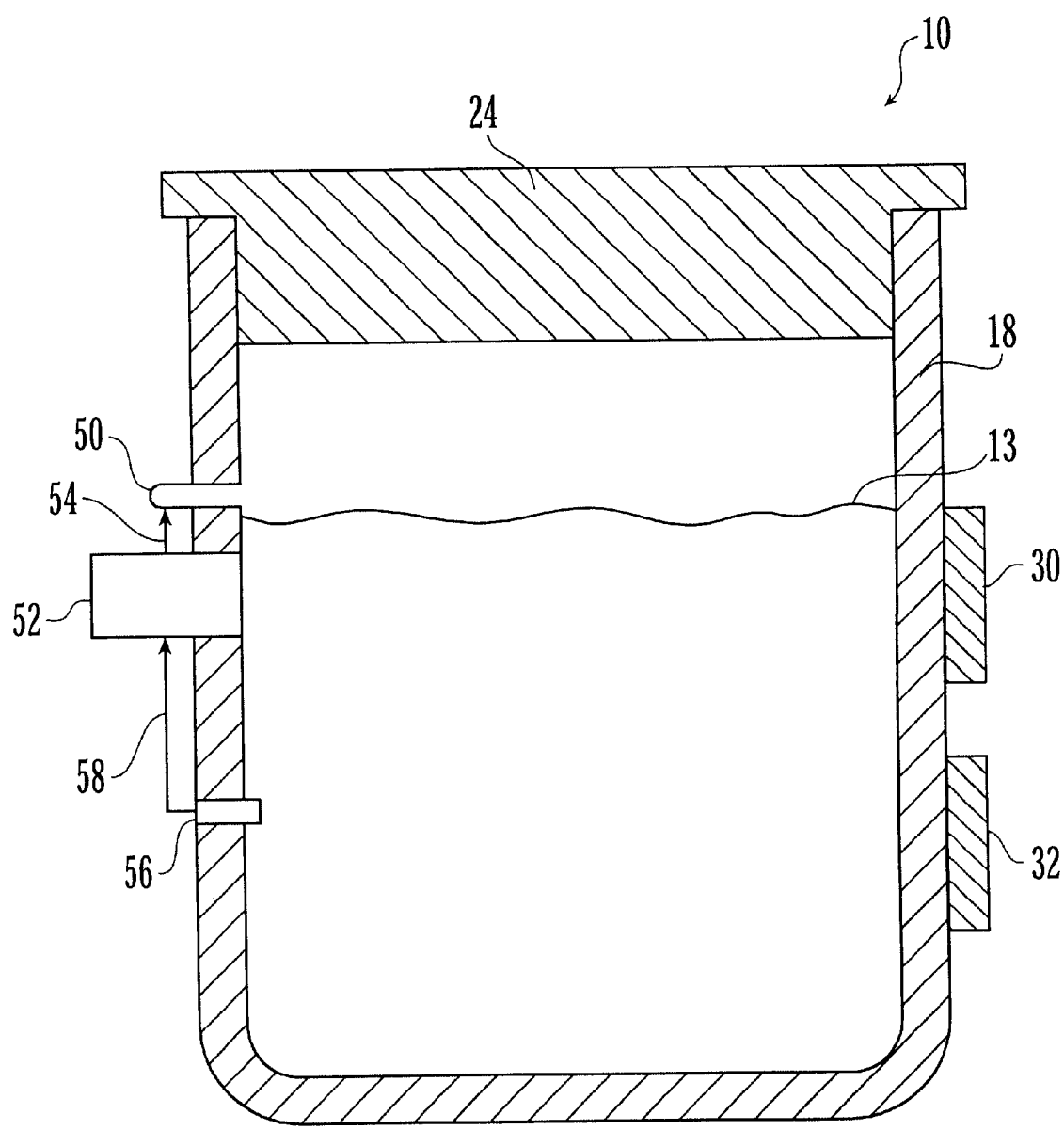
FIG. 3 is a schematic diagram of the pressure control system in accordance with another aspect of he invention.

In accordance with another aspect of the invention, pressure release is controlled to avoid significant temperature drops which may occur when the fryer is opened near the conclusion of a cooking cycle. FIG. 3 schematically illustrates a pressure release system in accordance with this aspect of the invention wherein like parts have been numbered accordingly. Although not specifically illustrated, this aspect of the invention can be utilized alone or in combination with the cool zone design according to the invention as described above. In fact, the pressure control system according to the invention may be particularly useful in combination with the cool zone design according to the invention due to the possibility of an increased amount of dissolved water in the hot cooking fluid.

The system according to the invention comprises a conventional pressure release valve 50, such as a solenoid valve, mounted by piping connection to an exhaust port in a side wall 18 of the vat 12. The system further includes a controller 52 mounted adjacent the vat and connected to the release valve 50 by signal line 54. The controller 52 preferably comprises a microprocessor-based controller, programmed in accordance with techniques well known to those skilled in the art, to monitor the change of temperature and effect the release of pressure accordingly, and to calculate other functions as will be described in detail below. Electric heating elements 30, 32 heat the fluid contained within the vat 12 in the manner described above. Gas burners 40 as illustrated in FIG. 2 or other appropriate heating means can also be used.

At a predetermined time near the end of the cooking cycle, indicated in a well-known manner by a timer (not shown), the controller 52 sends a release signal to the pressure release valve 50 over the signal line 54. Alternatively, the predetermined time for the release signal can be calculated by the controller independently for each cooking cycle during the cycle based on factors sensed and input to the controller, such as time, temperature and food product. Preferably, the release signal is sent approximately one minute prior to the end of the cooking cycle although, as stated, the predetermined time may be determined on a case-by-case basis. In response to the signal received from the controller 52, the pressure release valve 50 opens and begins releasing pressure which has built-up within the vat 12. The heating elements 30, 32 continue to operate to complete the cooking cycle and help maintain temperature. As the pressure begins to release through the valve 50, the water contained in the cooking oil 13 evaporates and the temperature of the cooking oil begins to drop.

The controller 52 is further connected to a temperature sensor(s) 56, such as a conventional thermistor probes, RTD or thermocouples, mounted within the vat 12 so as to monitor the temperature of the oil 13 during the cooking process in accordance with well-known techniques. In addition, the temperature monitor 56 provides signals to the controller 52 over signal line 58 which enables the controller to determine the rate of change of temperature of the cooking oil 13. The temperature of the cooking fluid 13 is sampled at predetermined time intervals to compute the rate of change from successive temperature measurements. A preferred temperature sampling rate has been found to be three samples per second, although other rates could be used as desired. As those skilled in the art will further appreciate, this rate of change of the temperature may be determined by any well-known digital or analog technique. The rate of temperature change is then utilized by the controller 52 to control operation of the pressure release valve 50 as described below.

In particular, if the controller 52 determines that the rate of change of the temperature of the cooking oil 13 is negative, i.e., the temperature of the cooking oil 13 is decreasing, and if the temperature itself is at or below a predetermined set temperature stored in a memory unit (not shown) associated with the controller, the controller 52 immediately sends a signal to the pressure release valve 50 via the signal line 54 to shut the valve and prevent further release of pressure from the vat 12. Preferably, the predetermined set temperature is between about 270°–325°, more preferably approximately 280° F. Those skilled in the art will appreciate, however, that other temperatures may also be used in accordance with the operating parameters of the fryer, such as the type of food being cooked and the desired cooking result.

After the pressure release valve has been shut, the continuing action of the heating elements 30, 32 will cause the temperature of the cooking fluid 13 contained in the vat 12 to increase. The controller 52 continuously monitors the temperature signal received from the temperature sensor 56 over the signal line 58 to determine if the temperature of the cooking fluid 13 has risen above the predetermined temperature or if the rate of temperature change is positive. When the controller 52 has detected either condition, the controller sends a signal to the release valve 50 over the signal line 54 to again open the valve 50 and release pressure. Once the valve is opened, the temperature and rate of change thereof are again monitored as described above to detect whether the temperature of the cooking oil 13 is below the set temperature and falling. If such a situation occurs, the release valve 50 will again be shut and the process repeated. Thus, it can be appreciated that rather than simply releasing the pressure all at once and suffering a rapid and undesirable temperature drop in the cooking oil 13, the release valve 50 is periodically pulsed open and closed and the pressure is intermittently released. Substantially all of the pressure within the vat 12 is released when the cooking cycle concludes so that the vat can be substantially immediately opened and cooked food items removed safely therefrom. The present invention ensures that pressure is released at the maximum rate possible without experiencing undesirable temperature drops.

While the above describes the preferred embodiment of the invention, it can be appreciated that other variations will be apparent to those of ordinary skill in the art. For example, other types of controllable valves may be utilized, other cooking medium may be utilized, etc. Furthermore, rather than the valve being opened and closed fully, it may be opened partially with the amount of opening depending upon the temperature condition.

As will be apparent to those skilled in the art, various modifications and adaptations of the embodiments described above will become readily apparent without departure from the spirit and scope of the invention, the scope of which is defined in the appended claims.

What is claimed is:

1. Apparatus for cooking food under pressure in a cooking fluid, said apparatus comprising:

a vat for containing said cooking fluid, said vat including a plurality of side walls and a bottom surface, said bottom surface containing at least one lowermost point with respect to cooking fluid in the vat; and a plurality of heating elements activated during a cooking cycle to heat a portion of said cooking fluid to a predetermined cooking temperature, said heating elements being positioned on said side walls at a sufficient vertical distance above said lowermost point of said bottom surface to maintain (i) the cooking fluid contained below said elements at a temperature above the boiling point of water contained in the cooking fluid and (ii) at least a portion of the cooking fluid contained below said elements substantially below said predetermined cooking temperature to define a cool zone in a region adjacent said bottom surface of said vat for preventing burning of food particles deposited therein and build-up of moisture.

2. The apparatus defined in claim 1, wherein said heating elements comprise upper and lower electric heating elements mounted on said side walls.

3. The apparatus defined in claim 2, wherein a bottom edge of each of said lower electric heating elements is positioned approximately 2 inches above said lowermost point of said bottom surface.

4. The apparatus defined in claim 1, wherein said heating elements comprise gas burners mounted on said side walls.

5. The apparatus defined in claim 4, wherein a bottom edge of each of said gas burners is positioned approximately 2 inches above the lowermost point on said bottom surface.

6. The apparatus defined in claim 1, wherein said vertical distance is sufficient to maintain the temperature of said cooking fluid in said cool zone at approximately 245° during the cooking cycle.

7. The apparatus defined in claim 1, wherein said bottom surface comprises a shallow dish shape with a substantially flat portion surrounded by a plurality of gently sloping portions.

8. The apparatus defined in claim 7, wherein each of said gently sloping portions has a upward slope of about 13° to 17° with respect to a horizontal plane containing said lowermost point.

9. A pressure fryer for cooking food items under pressures comprising:

a substantially rectangular vat for containing cooking fluid, said vat having side walls and a bottom surface, wherein said bottom surface is shallowly dished and comprises a substantially flat base portion surrounded by a plurality of sloping portions; and a plurality of heating elements attached to said side walls of said vat for heating the fluid contained therein to a predetermined cooking temperature, wherein the bottom edge of each of said heating elements is positioned at a predetermined height above said flat base portion, wherein said predetermined height is selected such that the temperature of the cooking fluid in a region of said vat between said bottom edge of each of said heating elements and said flat base portion of said bottom surface is maintained above the boiling point of water contained within the cooking fluid thereby preventing condensation of such water and at least a lower most portion of the cooking fluid in said region is maintained at a temperature below said predetermined cooking temperature as a result of said predetermined height.

10. The pressure fryer defined in claim 9, wherein said heating elements comprise upper and lower electric heating elements positioned on each of said walls of said vat, said lower heating elements having a bottom edge positioned at a height of approximately 2 to 3 inches above said flat base portion.

11. The pressure fryer defined in claim 9, wherein said heating elements comprise gas burners positioned on two of said side walls of said vat, said burners having a bottom edge positioned at a height of approximately 2 to 3 inches above said flat base portion.

12. The pressure fryer defined in claim 9, wherein said sloping portions have an upward slope in the range of about 9° to 21° with respect to said flat base portion.

13. Apparatus for cooking food items under pressure during a cooking cycle, said apparatus comprising:

a vat for containing cooking fluid, said vat having side walls and a bottom surface;

at least one heating element attached to said side walls of said vat for heating the cooking fluid contained therein to a predetermined cooking temperature, said heating element being positioned on said side wall at a sufficient vertical distance above said bottom surface to maintain the cooking fluid contained therebelow at a temperature above the boiling point of water contained in the cooking fluid and at least a portion of the cooking fluid contained therebelow at a temperature substantially below said predetermined cooking temperature to define a cool zone in a region adjacent said bottom surface of said vat for preventing burning of food particles deposited therein and build-up of moisture;

means for sensing temperature mounted in said vat to determine the temperature of said cooking fluid contained therein above said cool zone;

valve means mounted on said vat for releasing pressure built up in said vat during said cooking cycle; and control means connected to receive temperature input from said temperature sensing means indicating the temperature of said cooking fluid for opening said valve means beginning at a predetermined time prior to the end of said cooking cycle when said temperature input received from said temperature sensing means indicates that the temperature of said cooking fluid is above a predetermined temperature level, and for closing said valve means when the temperature of said cooking fluid is below said predetermined temperature level.

14. The apparatus defined in claim 13, wherein said heating elements comprise upper and lower electric heating elements positioned on each of said walls of said vat, said lower heating elements having a bottom edge positioned at a height of approximately 2 to 3 inches above said flat base portion.

15. The apparatus defined in claim 13, wherein said heating elements comprise gas burners positioned on at least two of said side walls of said vat, said burners having a bottom edge positioned at a height of approximately 2 to 3 inches above said flat base portion.

16. The apparatus defined in claim 13, wherein said sloping bottom surface of said vat includes a substantially flat base portion surrounded by a plurality of gently sloping portions.

17. The apparatus defined in claim 16, wherein said sloping portions have a slope in the range of 13° to 17° with respect to said flat base portion.

18. Apparatus for cooking items under pressure during a cooking cycle comprising:

a vat for containing cooking fluid for cooking food items therein;

means for sensing temperature mounted in said vat to determine the temperature of said cooking fluid contained therein;

valve means mounted on said vat for releasing pressure built up in said vat during said cooking cycle; and a controller connected to receive temperature input from said temperature sensing means beginning at a predetermined time prior to the end of said cooking cycle;

said controller for opening and reopening said valve means when said valve means is closed and said temperature input received from said temperature sensing means indicates that the temperature of said cooking fluid is above a predetermined temperature level, and said controller for closing said valve means when said valve means is open and the temperature of said cooking fluid is below said predetermined temperature level wherein;

(I) said controller further determines whether the temperature of the cooking fluid is rising or falling based on input from the sensing means;

(II) said controller closes said valve means when the temperatures of the cooking fluid is both below the predetermined temperature and said temperature is falling; and (III) said controller maintains said valve means open under all other temperature conditions between the predetermined time and the end of the cooking cycle.

19. The apparatus defined in claim 18, wherein said predetermined temperature is approximately 270°–325°.

20. The apparatus defined in claim 18, wherein said temperature sensing means is selected from the group consisting of a thermistor probe, a RTD, and a thermocouple.

21. The apparatus defined in claim 18, wherein said pressure releasing means comprises a solenoid valve.

* * * * *